United States Patent
Kimber

(10) Patent No.: US 10,501,142 B2
(45) Date of Patent: Dec. 10, 2019

(54) MOTORCYCLE SUSPENSION SYSTEM AND SEAT MECHANISM

(71) Applicant: Triumph Designs Limited, Leicestershire (GB)

(72) Inventor: Ian Michael Kimber, Leicestershire (GB)

(73) Assignee: Triumph Designs Limited, Leicestershire (GB)

( * ) Notice: Subject to any disclaimer, the term of this patent is extended or adjusted under 35 U.S.C. 154(b) by 615 days.

(21) Appl. No.: 15/151,229

(22) Filed: May 10, 2016

(65) Prior Publication Data

US 2016/0332692 A1    Nov. 17, 2016

(30) Foreign Application Priority Data

May 11, 2015    (GB) .................................. 1507964.3

(51) Int. Cl.
   *B62K 25/28*    (2006.01)
   *B62K 11/04*    (2006.01)
   *B62J 1/08*     (2006.01)

(52) U.S. Cl.
   CPC ............ *B62K 25/283* (2013.01); *B62K 11/04* (2013.01); *B62K 25/286* (2013.01); *B62J 2001/085* (2013.01)

(58) Field of Classification Search
   CPC ..... B62K 25/283; B62K 11/04; B62K 25/286
   USPC ........................................................ 280/284
   See application file for complete search history.

(56) References Cited

U.S. PATENT DOCUMENTS

| 4,540,193 | A  | * | 9/1985  | Noda      | B62K 25/286 180/219 |
| 4,706,774 | A  | * | 11/1987 | Tsuboi    | B62K 11/04 180/227  |
| 4,721,179 | A  | * | 1/1988  | Yamaguchi | B62K 25/26 180/219  |
| 6,581,711 | B1 | * | 6/2003  | Tuluie    | B62K 25/286 180/227 |
| 7,086,658 | B2 | * | 8/2006  | Parigian  | B62K 25/283 180/227 |

(Continued)

FOREIGN PATENT DOCUMENTS

| DE | 20111216    U1 | 9/2001 |
| DE | 102006039311 A1 | 3/2007 |

(Continued)

OTHER PUBLICATIONS

Michael Jastad, "bikeE is ready to ride", Electric Bike Building website, Oct. 25, 2009, Electric Bike Building, LLC.

(Continued)

*Primary Examiner* — Jacob D Knutson
(74) *Attorney, Agent, or Firm* — Levenfeld Pearlstein, LLC

(57) ABSTRACT

A motorcycle (1) having front and rear ground-engaging wheels, the motorcycle (1) comprising a swing arm (5) supporting the rear wheel (3), a rear suspension unit (RSU) (12), a drop link (14) pivotally connected to the RSU (12) and pivotally connected to the swing arm (5), and a drag link (16) pivotally connected to the drop link (14). The drop link (14) extends between the RSU (12) and the drag link (16) for increasing a travel distance of the RSU (12) relative to a travel distance of the swing arm (5). The RSU (12) is mounted underneath a seat (42).

19 Claims, 8 Drawing Sheets

(56) References Cited

U.S. PATENT DOCUMENTS

| | | | | |
|---|---|---|---|---|
| 7,870,924 | B2* | 1/2011 | Fujita | B62K 19/38 180/219 |
| 8,100,113 | B2* | 1/2012 | Sugiyama | B62J 37/00 123/509 |
| 2002/0144850 | A1* | 10/2002 | Gogo | B62K 25/283 180/227 |
| 2005/0206204 | A1 | 9/2005 | Ogawa et al. | |
| 2008/0196960 | A1* | 8/2008 | Brown | B62K 11/04 180/227 |
| 2009/0001780 | A1* | 1/2009 | Clarkson | B62J 1/12 297/195.1 |
| 2016/0096583 | A1* | 4/2016 | Kawai | B62K 25/04 180/227 |

FOREIGN PATENT DOCUMENTS

| | | | |
|---|---|---|---|
| JP | 57060985 | A | 4/1982 |
| JP | 59050887 | A | 3/1984 |
| JP | 60240584 | A | 11/1985 |
| JP | 62221987 | A | 9/1987 |
| WO | 2012101336 | A1 | 8/2012 |

OTHER PUBLICATIONS

United Kingdom Search Report in connection with GB1507964.3 dated Feb. 9, 2016.
United Kingdom Search Report in connection with GB1507964.3 dated Oct. 12, 2015.

\* cited by examiner

MOTORCYCLE SUSPENSION SYSTEM AND SEAT MECHANISM

FIELD OF THE INVENTION

This invention relates to a motorcycle suspension system and seat mechanism. Particularly, the invention relates to a rear suspension system and adjustable seat mechanism for a bobber style motorcycle.

BACKGROUND TO THE INVENTION

Bobber motorcycles are typically stripped down custom motorcycles featuring a minimalistic design having all superfluous parts removed to reduce weight and obtain the "bobber style". Many bobber motorcycles feature a hard tail frame, i.e. with no rear suspension, and have no airboxes, ABS and batteries which saves a lot of space in the central area of the motorcycle and helps to give its simplistic, "open" look. In addition, one of the typical characteristics of a bobber motorcycle is a relatively low and far back seat position, which is permitted by the lack of rear suspension.

In order to reduce the amount of parts in a bobber motorcycle, it is often not designed with a high focus on ergonomics. Style and look of a bobber is very important but it is also desirable to achieve this style without compromising function. This leads to technical challenges which must be overcome to achieve both the bobber style and a safe and ergonomic design with good riding performance, with original equipment needed to meet regulations, e.g. homologation requirements.

It is difficult to keep both motorcycle wheels on the ground at all times without a rear suspension. Therefore, in order to meet the safety requirements of a modern motorcycle, a rear suspension unit (RSU) needs to be included. Having rear suspension not only provides a better riding performance and higher standard of safety, but is also more comfortable to ride. A RSU takes up a significant amount of space on a motorcycle, which, as mentioned above, is unwanted in a bobber due to the minimalistic design aspirations. Previous designs of a RSU on custom bobber motorcycles include positioning the rear suspension underneath the frame or along either side of the wheels but these either take up a lot of space or disrupt the appearance of a hard tail frame. In addition, taking into account the restricted space available, a RSU must meet a required suspension performance to provide a relatively smooth ride.

In order to meet regulatory requirements, an airbox also needs to be included. The air filter, which sits inside the airbox has to meet certain size requirements, which link directly to the lifetime of the filter. Simplistically, the larger the area of the filter, the longer the filter will last. This in turn dictates the frequency of service intervals, which directly translates into the maintenance cost of the motorcycle. Hence, a bigger filter is more desirable for the customer, because it means that the motorcycle will need to be serviced less frequently. One way that a bigger filter surface area is achieved is by increasing the volume of the airbox.

The most common practice for a bobber is to have a solo seat mounted above a hard tail frame. The seat is usually hinged at the front and then supported at the back using springs. This design does not allow for adjustability of the riding position, which in turn limits the ergonomic range of the motorcycle.

The present invention has therefore been devised with the foregoing in mind. The invention seeks to overcome or ameliorate at least one of the disadvantages of the prior art, or provide a useful alternative.

SUMMARY OF THE INVENTION

According to a first aspect of the present invention there is provided a motorcycle having front and rear ground-engaging wheels. The motorcycle comprises a swing arm supporting the rear wheel, a rear suspension unit (RSU), a drop link pivotally connected to the RSU and pivotally connected to the swing arm, and a drag link pivotally connected to the drop link. The drop link extends between the RSU and the drag link for increasing a travel distance of the RSU relative to a travel distance of the swing arm, and the RSU is mounted underneath a seat. This has the advantages of keeping both motorcycle wheels on the ground at all times, providing a better riding performance and higher standard of safety whilst also achieving a minimalistic appearance. The drop link and drag link allow the RSU to be packaged closer to the front of the swing arm, underneath a seat without reducing RSU travel. Further the linkage arrangement allows control of the effective displacement ratio of the RSU to rear wheel travel.

The seat may have a seat position that is lower than the top of a swing arm mounted mudguard. This has the advantage of providing a low riding position and achieving the bobber style.

The seat may have a seat position that is lower than the top of the rear wheel.

A swing arm tube of the swing arm and left and right frame sections of the main frame may be longitudinally aligned for giving the appearance of a single frame line, and wherein the RSU may be located between the left and right frame sections. This has the advantage of achieving stylistic requirements and packaging the RSU in a small area.

The RSU may be centrally mounted with respect to a transverse direction of the motorcycle.

The RSU may be located forward of a rear wheel.

The RSU may be located between the seat and the rear wheel with respect to a longitudinal direction of the motorcycle.

The RSU may be located beside at least one airbox with respect to a transverse direction of the motorcycle.

The motorcycle may comprise two airboxes, wherein the RSU may be located between the airboxes with respect to a transverse direction of the motorcycle. This has the advantage of enabling the rear suspension system to provide enough travel distance to meet the performance requirements of reducing shock and improving safety. Further, this enables an airbox to be provided in the space available and location required which is large enough to meet requirements.

According to a second aspect of the present invention there is provided a motorcycle having front and rear ground-engaging wheels, a seat and a seat mounting beam. The seat mounting beam is cantilevered from a main frame of the motorcycle, and the seat is releasably secured to the mounting beam so as to be adjustable over a range of seat positions in a longitudinal direction of the mounting beam. This has the advantage of allowing different riding positions to be achieved to improve ergonomics.

At least a lowest position of the seat may be lower than a top of the rear wheel of the motorcycle.

The seat may be adjustable in a longitudinal direction with respect to the motorcycle. This allows the riding position to be moved forward and backwards.

The seat may be adjustable in a vertical direction with respect to the motorcycle. This allows the height of the riding position to be adjusted.

The seat may comprise a connecting means and the mounting beam may comprise at least a slot for adjustably connecting the seat to the mounting beam.

The seat and the seat mounting beam may extend over a rear suspension unit (RSU). This has the advantage of achieving a safe and ergonomic design meeting stylistic requirements in a tight packaging environment.

BRIEF DESCRIPTION OF THE INVENTION

An embodiment of the invention will now be described, by way of example only, with reference to the accompanying drawings in which.

DESCRIPTION OF THE EMBODIMENTS OF THE INVENTION

Figure 1:
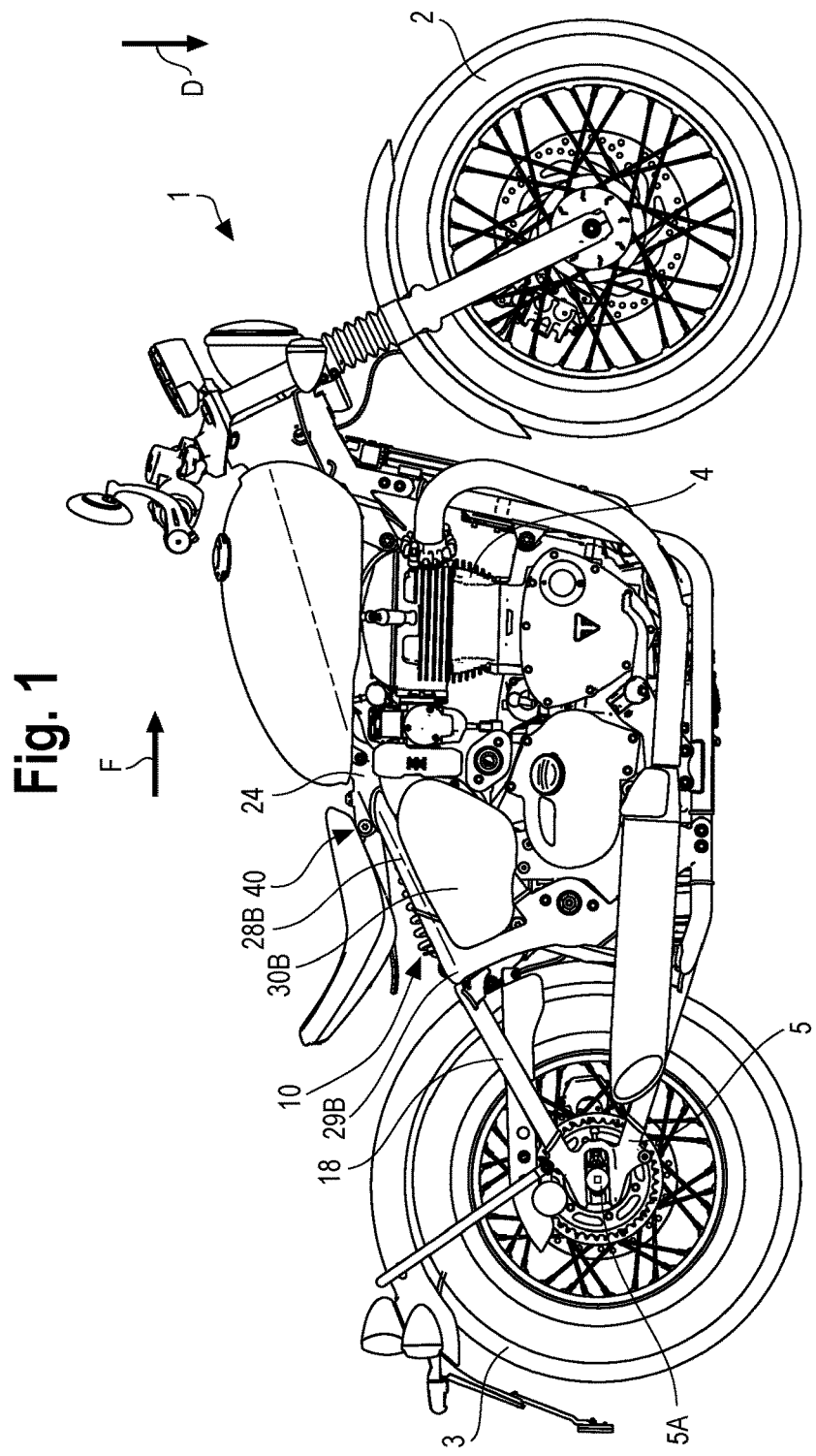
FIG. 1 shows a side view of a motorcycle having a rear suspension system in accordance with an embodiment of the present invention.
Figure 2:
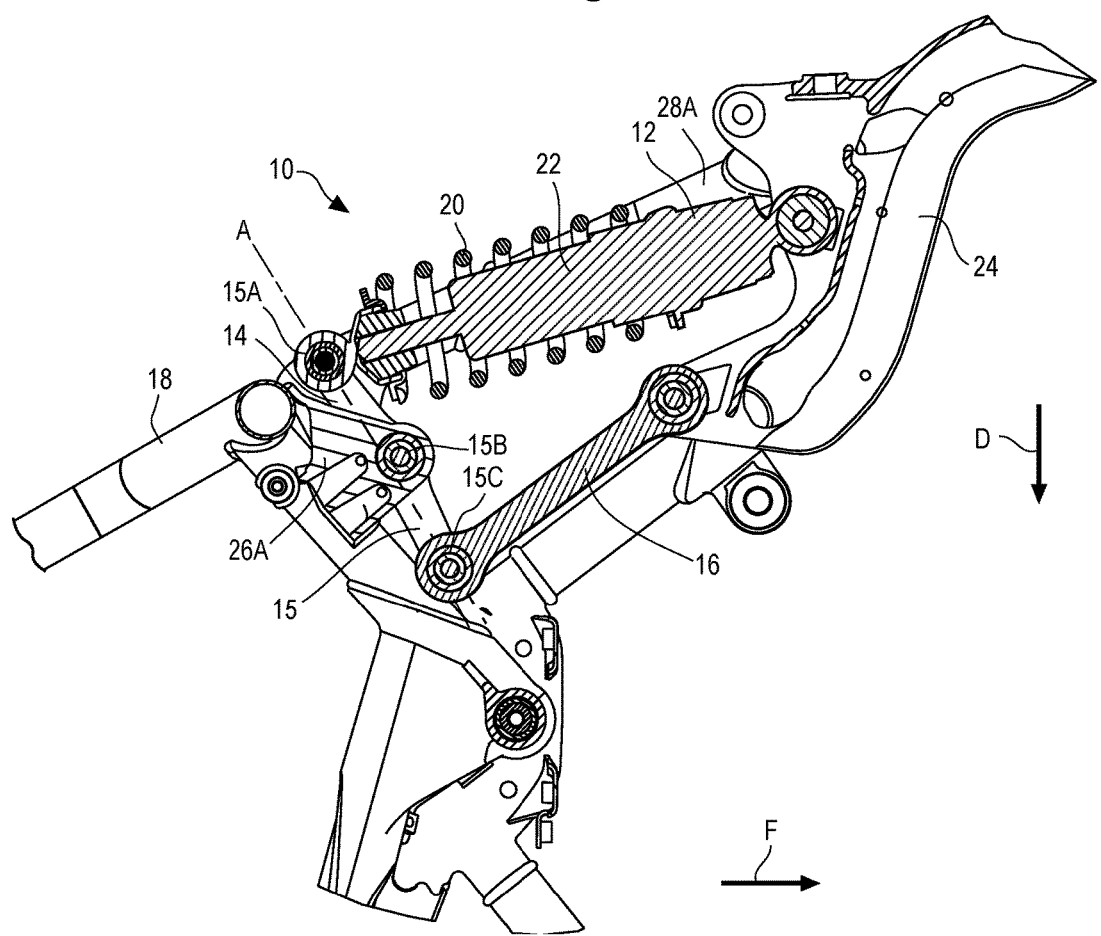
FIG. 2 shows a cross sectional side view of a rear suspension system of the embodiment of FIG. 1.
Figure 3:
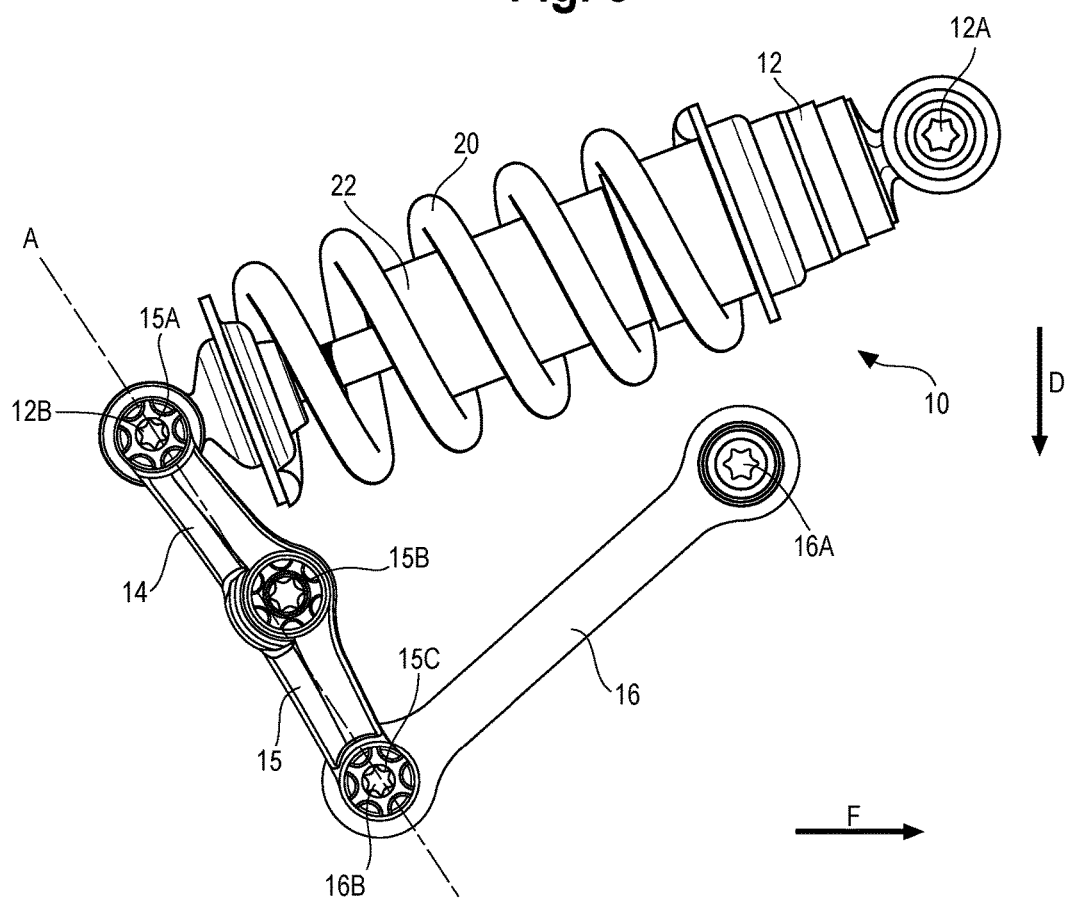
FIG. 3 shows a side view of a rear suspension system of the embodiment of FIG. 1.

With reference to FIG. 1 there is shown a bobber style motorcycle 1 comprising a front wheel 2, a rear wheel 3, a parallel twin engine 4, a swing arm assembly (or swing arm) 5, a rear suspension system 10, a main frame 24 and a seat mechanism 40. With reference to FIGS. 2 and 3, the rear suspension system 10 of the motorcycle 1 is shown in more detail. The rear suspension system 10 comprises a rear suspension unit (RSU) 12, a rocker arm, herein referred to as a drop link 14, and a linkage arm, herein referred to as a drag link 16. Further, the rear suspension system 10 is connected to a swing arm tube 18 of the swing arm 5 which supports the rear wheel 3 of the motorcycle 1. The RSU 12 is a standard shock absorber with a coil spring 20 around the damper body 22 of the RSU 12. To aid understanding, directions referred to in the description shall be taken with respect to the conventional orientation of the motorcycle 1, i.e. forwards will be towards the direction of travel, arrow F, and downwards will be towards the ground, arrow D.

The RSU 12 is centrally mounted in the motorcycle 1, i.e. along a line vertically bisecting the motorcycle 1 from rear to front. The forward end of the RSU 12 is pivotally mounted to the main frame 24 with the rear end of the RSU 12 pivotally mounted to an upper end of the drop link 14. The RSU 12 includes two holes for mounting, a forward hole 12A and a rear hole 12B.

The drop link 14 comprises two identical substantially straight metal drop link bars 15, each having three holes, an upper hole 15A for connecting to the RSU 12, a middle hole 15B for connecting to the swing arm tube 18, and a lower hole 15C for connecting to a rear end of the drag link 16. Nuts, bolts and screws are used to secure the parts of the rear suspension system 10 to the main frame 24 and to each other. The rear ends of the RSU 12 and the drag link 16 are both mounted between the drop link bars 15 with the rear end of the drag link 16 being below the rear end of the RSU 12.

The centre of the middle hole 15B is misaligned with respect to a line A joining the centres of upper hole 15A and lower hole 15C, i.e. it is located further forward in a perpendicular direction from line A. The misalignment of middle hole 15B assists in packaging the drop link 14 into the available space on the motorcycle 1 and also has structural benefits. The swing arm tube 18 is connected to the drop link 14 via the middle hole 15B through connecting plates 26A, 26B. The drop link 14 extends forwards and downwards at an angle to the vertical direction and is pivotally connected at a lower end to a drag link 16. The drag link 16 is a straight metal bar with two holes for mounting, a forward hole 16A and a rear hole 16B. From the connection to the drop link 14, the drag link 16 extends forwards and upwards at an angle to the horizontal direction. The front end of the drag link 16 is pivotally mounted to the main frame 24 below the RSU 12. The swing arm tube 18 of the swing arm 5 is a metal tube which extends around a rear wheel 3 (not shown) of the motorcycle 1 and connects with the rear wheel axle 5A. The rear suspension system 10 and thus the RSU 12 is located forward of the rear wheel 3 and towards the front of the swing arm 5 without reducing RSU 12 travel.

Figure 4:
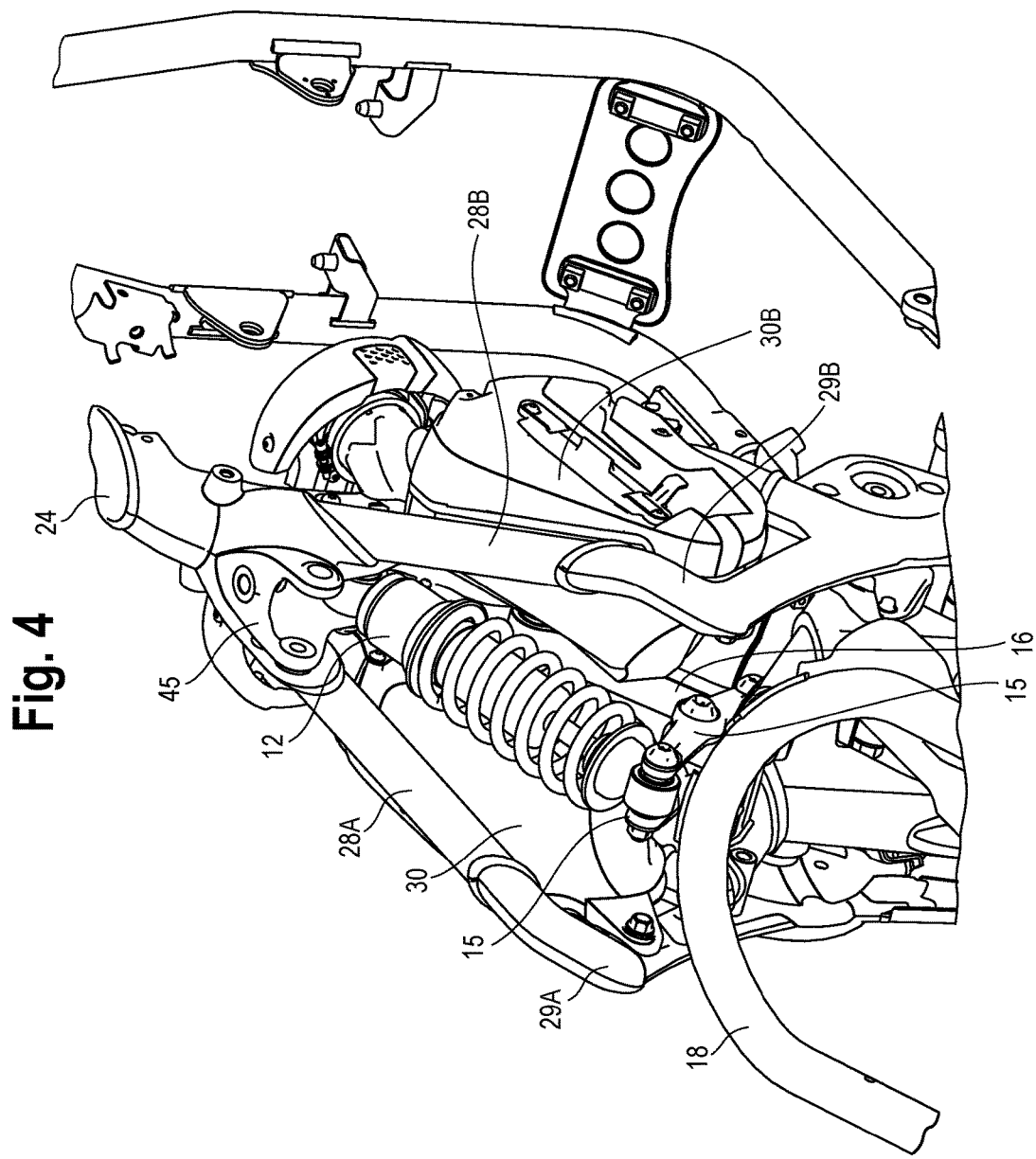
FIG. 4 shows a perspective view of a rear suspension system of the embodiment of FIG. 1 and airboxes in a frame.

Referring to FIG. 4, the rear suspension system 10 is shown in a perspective view within the main frame 24. The RSU 12 is located between two tubular frame sections, a left frame section 28A and a right frame section 28B, which are symmetrical and extend rearwardly from the main frame 24 from approximately the location where the forward end of the RSU 12 is mounted to the main frame 24. The left and right frame sections 28A, 28B, extend around the RSU 12 and are angled away from the RSU 12 as they extend rearwardly before attaching to left and right castings 29A, 29B, which extend rearwardly and then extend downwardly. As can be seen from FIG. 1, the swing arm tube 18 and the left and right frame sections 28A, 28B, are generally aligned so as to give the appearance of a single frame line extending from under the fuel tank to the rear wheel axle 5A. This helps to give the motorcycle 1 a distinctive bobber style. Mounted to the left and right castings 29A, 29B, and the main frame 24 are two airboxes, a left airbox 30A and a right airbox 30B. The left airbox 30A and the right airbox 30B are positioned outwardly from the RSU 12 with the left airbox 30A below the left frame section 28A and the right airbox 30B below the right frame section 28B. That is, the RSU 12 is positioned between the left airbox 30A and the right airbox 30B. In addition, the RSU 12 is positioned in between the symmetrical left and right frame sections 28A, 28B, which avoids detracting from the appearance of the single frame line of the motorcycle 1.

The rear suspension system 10 with the drop link 14 and drag link 16 provides an improved suspension performance by increasing the travel distance of the rear suspension system 10 because the RSU 12 is connected to the drop link 14 and not directly to the swing arm tube 18. That is, the travel distance of the RSU 12 relative to a travel distance of the swing arm 5 is increased. This means that an acceptable level of performance is achieved from the rear suspension system 10 in an arrangement that takes up little space and can be packaged in the available space within a central location in the motorcycle 1. This design also allows for a more cost effective RSU 12 and better control of suspension characteristics.

In use, the rear suspension system 10 is connected to the swing arm 5 which pivots and allows the rear wheel 3 to move vertically with respect to the main frame 24 of the motorcycle 1 in order to absorb bumps etc. in the road and provide a smoother ride. The movement of the rear wheel 3 over the road moves the swing arm 5, which is rigidly connected to the rear wheel axle 5A, which in turn moves the drop link 14. The drop link 14 acts on the RSU 12 and compresses the coil spring 20 which cushions the movement of the rear wheel 3. The linkage arrangement, i.e. the drop link 14 being connected to both the drag link 16 and the RSU 12 means the effective distance that the rear wheel 3 can travel is increased. The linkage arrangement controls the effective spring rate and allows the ratio of the RSU 12 travel over rear wheel 3 travel to be increased towards the end of the available travel distance of the rear suspension system 10. That is, the drop link 14 connected to the drag link 16 allows control of the effective displacement ratio of the RSU 12 to rear wheel 3 travel. Thus the rear wheel 3 movement is increasingly restrained by the spring towards the end of the available travel distance of the rear suspension system 10.

To meet the air filter lifetime requirements a certain size of air filter is required. However, this size requirement may not be achieved with a single airbox in the space available due to the RSU 12 being centrally mounted. Therefore, splitting the airbox into two parts, airboxes 30A, 30B, instead of having just one part, provides the required size of air filter while also providing the necessary space required for the rear suspension system 10. Further, the airbox needs to be big for homologation requirements because the smaller the airbox is, the louder the noise will be, This design allows the RSU 12 to sit between the airboxes 30A, 30B, and enables the rear suspension system 10 to provide enough travel distance to meet the performance requirements of reducing shock and improving safety. In this embodiment, the motorcycle 1 has a parallel twin engine and the position of the intake ports on a parallel twin engine require the airboxes 30A, 30B, to be behind the cylinder head. Therefore, the airboxes 30A, 30B, need to be located behind the engine in the same area where the RSU 12 is positioned.

Figure 5:
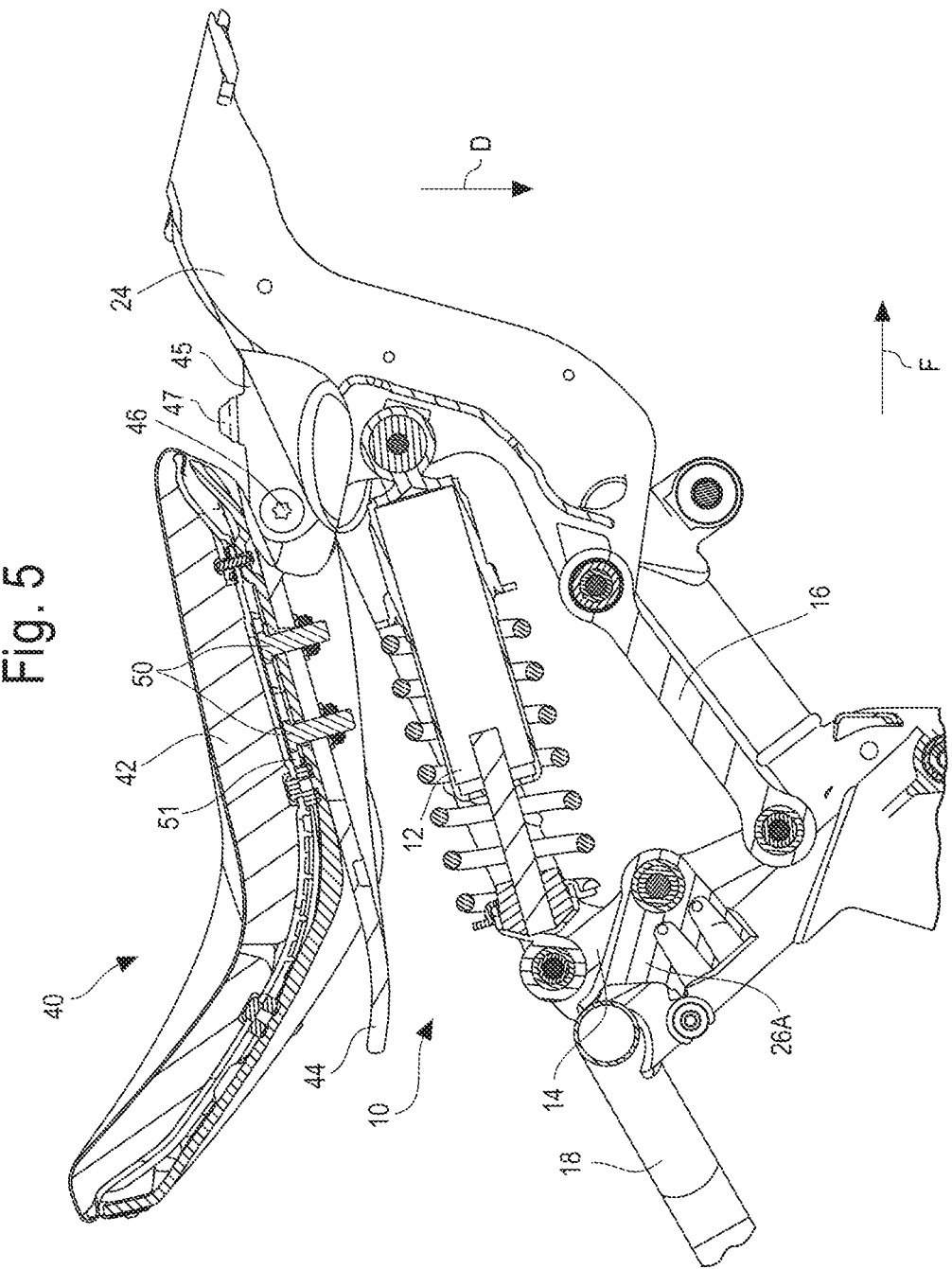
FIG. 5 shows a cross sectional side view of a rear suspension system and adjustable seat mechanism in accordance with an embodiment of the present invention.

With reference to FIG. 5, the rear suspension system 10 is shown once more in position on the main frame 24 but, additionally, the seat mechanism 40 is also shown. The seat mechanism 40 comprises a seat 42 and a seat mounting beam 44. The seat mechanism 40 is adjustable. The seat mechanism 40 is located above the rear suspension system 10, and in particular above the RSU 12. The mounting beam 44 is connected at its front end to the main frame 24 via a main frame casting section 45 and secured using horizontally orientated bolts 46 and a vertically orientated bolt 47. In another embodiment, the bolts 46 are pivotally adjustable to allow the angle of the seat mounting beam 44 to be moved. The mounting beam 44 forms a cantilever to support the seat 42 and is supported from its front end by the main frame 24.

Figure 6:
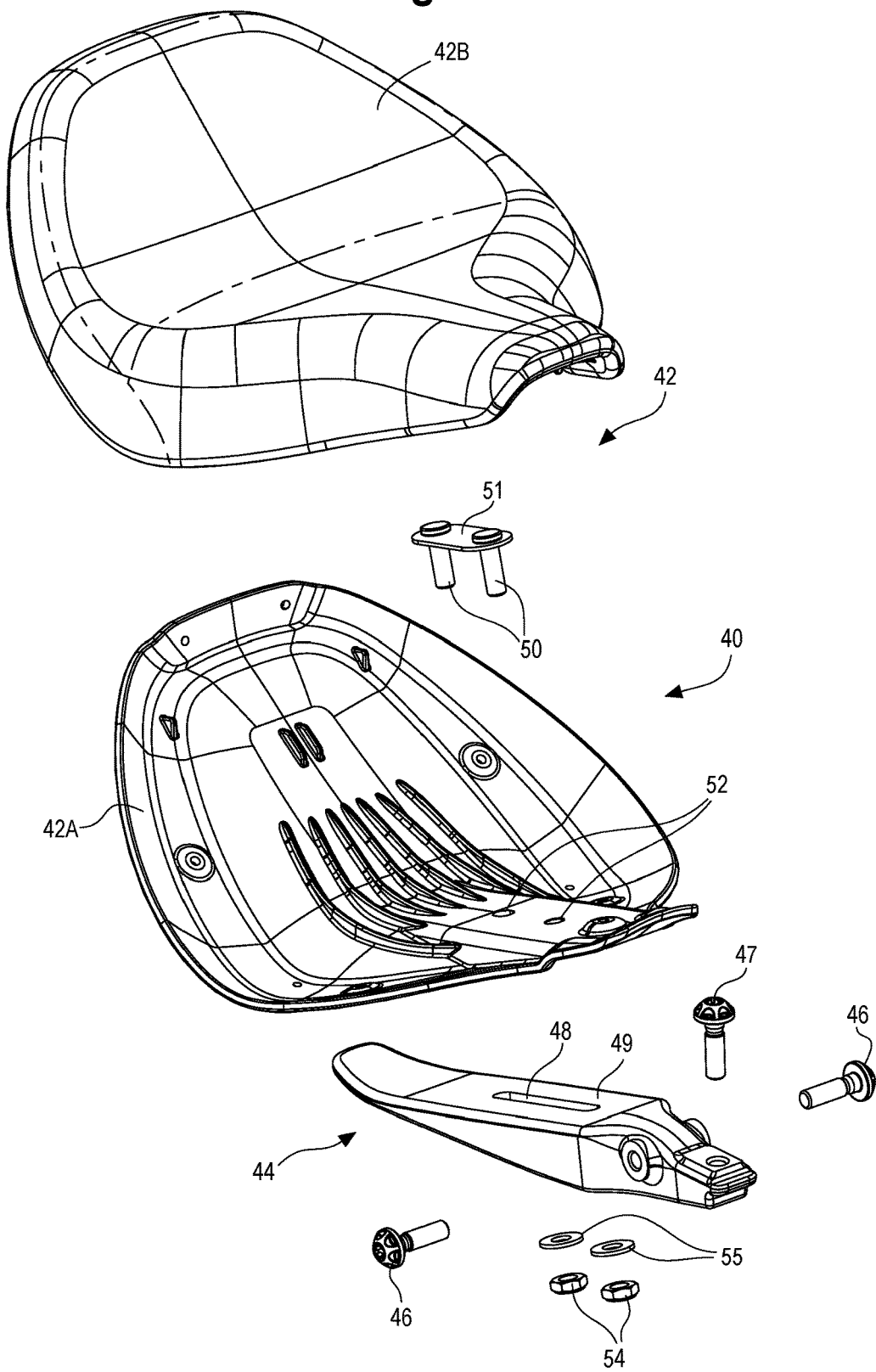
FIG. 6 shows an exploded view of an adjustable seat mechanism of the embodiment of FIG. 5.
Figure 7:
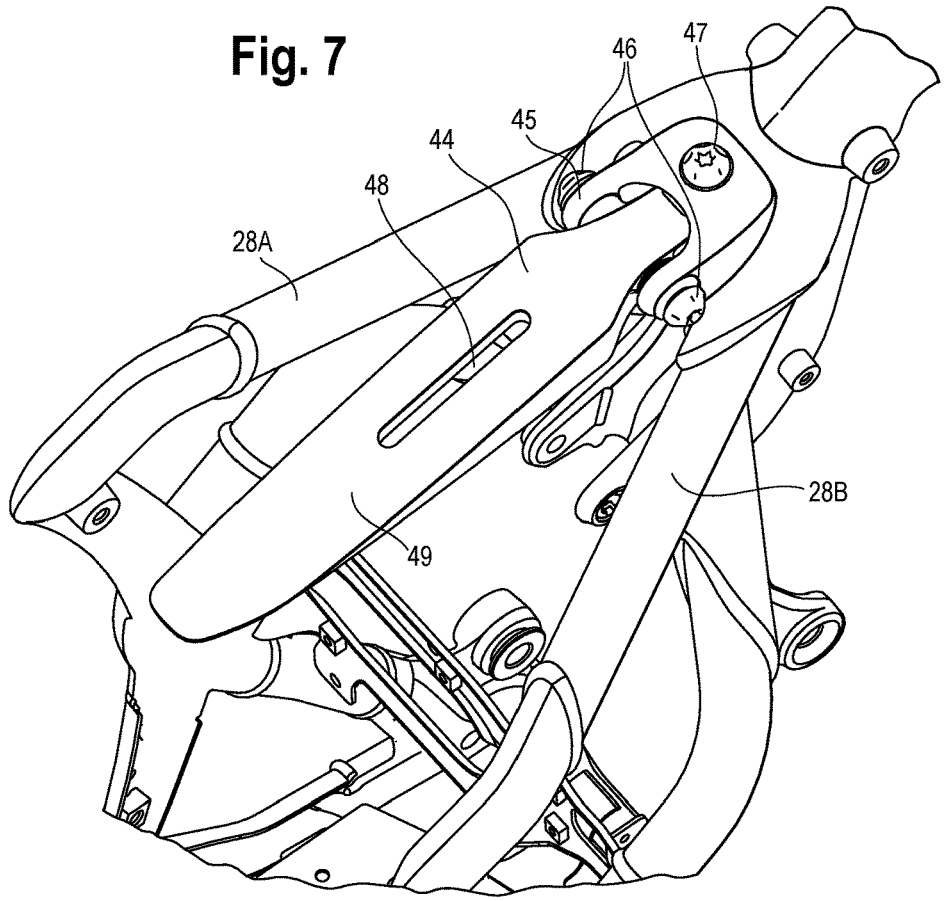
FIG. 7 shows a top perspective view of a mounting beam of an adjustable seat mechanism of the embodiment of FIG. 5.
Figure 8:
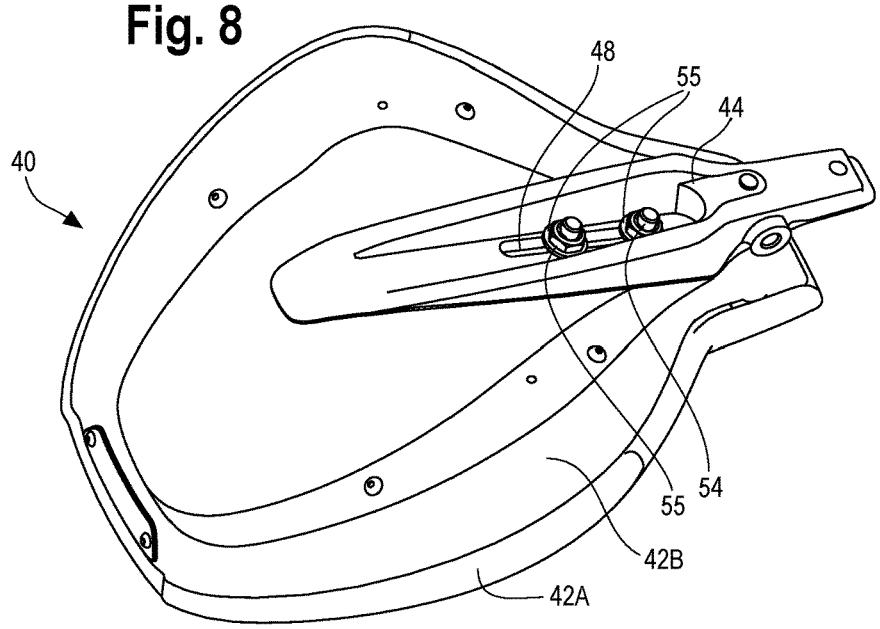
FIG. 8 shows a bottom perspective view of an adjustable seat mechanism of the embodiment of FIG. 5.

FIG. 6 shows an exploded view of the seat mechanism 40. The seat 42 comprises a seat base 42A and a seat pad 42B, the seat pad 42B being the cushioned section for the rider to sit on. The seat base 42A is connected to the seat pad 42B through a number of screws. A slot 48 is provided in an upper surface 49 of the mounting beam 44 which is sized to fit studs 50 of a stud plate 51—also see FIG. 7. The studs 50 are held in the stud plate 51 are passed downwards through circular holes 52 in the seat base 42B and then through the slot 48. Nuts 54 and washers 55 are provided to secure the studs 50 in position and in turn secure the seat base 42B, and thus seat 42, to the mounting beam 44—also see FIG. 8. The slot 48 extends a distance in a forwards/rearward direction along the upper surface 49 of the mounting beam 44, this distance being greater than the separation of the studs 50 in the plate 51 so that location of the seat 42 on the mounting beam 44 is adjustable.

Figure 9:
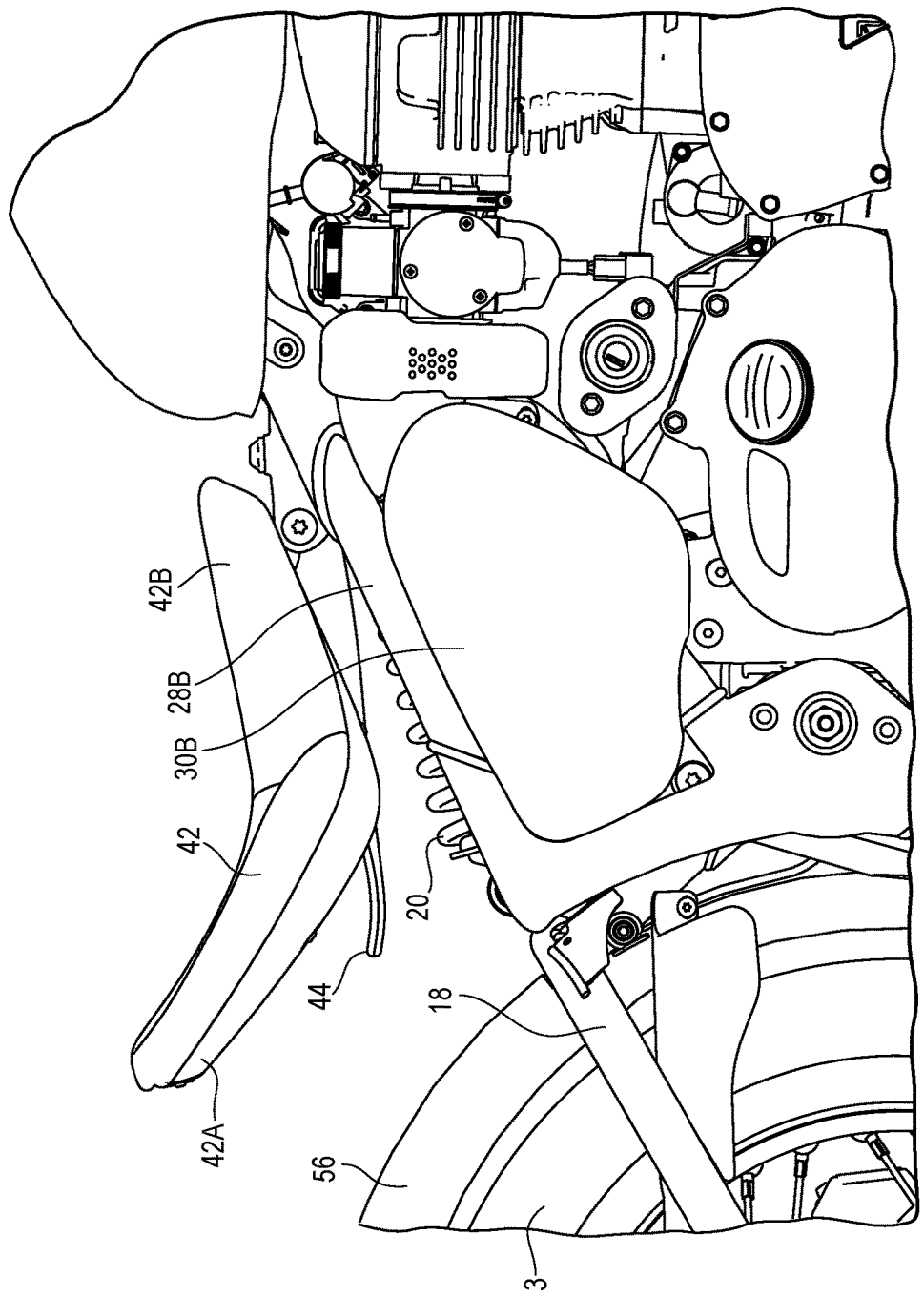
FIG. 9 shows a side view of a rear suspension system and adjustable seat mechanism of the embodiment of FIG. 5.

The seat 42 is adjustable by loosening the nuts 54, sliding the studs 50 in the slot 48 to another location, i.e. forwards or rearwards in the slot 48, and tightening the nuts 54 once more. In this manner the seat 42 is adjusted in a forward and rearward direction as required. In addition, due to the angle to the horizontal of the mounting beam 44 on the motorcycle 1, this forward and rearward adjustment also provides a vertical adjustment of the seat 42, although less noticeably than the horizontal adjustment. FIG. 9 shows the seat 42 in a forward position. The seat mechanism 40 allows full variable seat adjustment along the whole range provided by the length of the slot. In an alternative embodiment, there would be a set number of adjustment positions. The adjustable seat mechanism 40 allows riders with different heights etc. or riding style preferences to be accommodated on the motorcycle 1. In this embodiment, the seat 42 adjustment can only be achieved when the seat mechanism 40 is removed from the motorcycle 1. It can be understood that with alternative fastening means and the correct tools the seat 42 can be adjusted without removing the seat mechanism 40 or the seat 42 from the motorcycle 1.

FIG. 9 shows the seat 42 at a position further forwards and higher than when the seat 42 is in its fully backward position. As mentioned above, the seat 42 location is variable between the fully backward position and the fully forward position. Having the seat in its far back position best matches the style of a bobber motorcycle 1 while moving the seat forwards may allow for a more comfortable and ergonomic riding position.

In addition, the space created by using the cantilevered mounting beam 44 below the seat 42 and having no additional seat suspension is apparent. Due to having a rear suspension system 10 providing improved riding comfort and performance there is no need for additional suspension for the seat 42. This means an open space between a rear mudguard 56 and the seat 24 is provided, which is in line with the minimalist design of the motorcycle 1. The rear mudguard 56 is mounted on the swing arm 5. Further, enough clearance between the rear mudguard 56 and seat 42 is provided in order to fit the rear suspension 10 and allow for rear wheel 3 travel, which is vital in terms of riding performance. Bobbers typically want the seat as close to the rear wheel 3 as possible, but there needs to be enough space for the rear wheel 3 travel. The RSU 12 is located between a seat 42 and a rear wheel 3. The rear wheel 3 includes the tyre. The adjustability of the seat 42 would have been very difficult if suspension was provided on the seat 42, e.g. in the form of un-damped springs. Also, the ability to adjust the seat, not only in a vertical direction but in a horizontal direction as well, is hugely beneficial to achieving a flexible design to suit a customer's size and riding style preference. The seat 42 is adjustable to a position in which at least part of the seat 42 is below a top of the rear wheel 3 (or at least top of the rear mudguard 56).

The rear suspension system 10 is barely visible from the side view of FIG. 9 which achieves the minimalistic design of this motorcycle 1. However, the rear suspension system 10 is not fully hidden and can be seen. Thus, a motorcycle 1 achieving a safe and ergonomic design is achieved whilst also meeting the stylistic requirements due to the provision of a rear suspension system and adjustable seat in a tight packaging environment.

The present invention has the advantage that riding comfort is controlled better using rear suspension than undamped springs under the seat. Common designs of existing bobber motorcycles include supporting the seat using a coil, fork or leaf spring in order to improve riding comfort without a rear suspension. However, it is very hard to have adjustable seats using these designs and avoid reducing the seat suspension performance. The present invention allows the RSU 12 and the airboxes 30A, 30B, to be packaged on the motorcycle 1 in a relatively small area while still achieving the bobber style.

The invention claimed is:

1. A bobber motorcycle having a front ground-engaging wheel, a rear ground-engaging wheel and a seat mechanism located below a top of a swing arm mounted mudguard, the seat mechanism comprising a seat mounting beam and a seat, the motorcycle comprising:
   i a swing arm supporting the rear wheel;
   ii a rear suspension unit (RSU);
   iii a drop link pivotally connected to the RSU and pivotally connected to the swing arm; and
   iv a drag link pivotally connected to the drop link,
   wherein the drop link extends between the RSU and the drag link for increasing a travel distance of the RSU relative to a travel distance of the swing arm,
   wherein the RSU is mounted directly underneath the seat mechanism, and
   wherein the RSU is centrally mounted with respect to a transverse direction of the motorcycle.

2. The motorcycle of claim 1, wherein the seat has a seat position that is lower than the top of the swing arm mounted mudguard.

3. The motorcycle of claim 1, wherein the seat has a seat position that is lower than a top of the rear wheel.

4. The motorcycle of claim 1, wherein a swing arm tube of the swing arm and left and right frame sections of a main frame are longitudinally aligned for giving the appearance of a single frame line, and wherein the RSU is located between the left and right frame sections.

5. The motorcycle of claim 1, wherein the RSU is located forward of the rear wheel.

6. The motorcycle of claim 1, wherein the RSU is located between the seat and the rear wheel with respect to a longitudinal direction of the motorcycle.

7. The motorcycle of claim 1, wherein the RSU is located beside at least one airbox with respect to a transverse direction of the motorcycle.

8. The motorcycle of claim 7, comprising two airboxes, wherein the RSU is located between the airboxes with respect to the transverse direction of the motorcycle.

9. The motorcycle of claim 1, wherein the seat mounting beam is cantilevered from a main frame of the motorcycle, and the seat is releasably secured to the mounting beam so as to be adjustable over a range of seat positions in a longitudinal direction of the mounting beam.

10. The motorcycle of claim 9, wherein at least a lowest position of the seat is lower than a top of the rear wheel of the motorcycle.

11. The motorcycle of claim 9, wherein the seat is adjustable in a longitudinal direction with respect to the motorcycle.

12. The motorcycle of claim 9, wherein the seat is adjustable in a vertical direction with respect to the motorcycle.

13. The motorcycle of claim 9, wherein the seat comprises a connecting means and the mounting beam comprises at least a slot for adjustably connecting the seat to the mounting beam.

14. The motorcycle of claim 9, wherein the seat and the seat mounting beam extend over the RSU.

15. A bobber motorcycle having a front ground-engaging wheel, a rear wheel ground-engaging wheel, and a seat mechanism located below a top of a swing arm mounted mudguard, the seat mechanism comprising a seat mounting beam and a seat, the motorcycle comprising:
   i a swing arm supporting the rear wheel;
   ii a rear suspension unit (RSU);
   iii a drop link pivotally connected to the RSU and pivotally connected to the swing arm; and
   iv a drag link pivotally connected to the drop link,
   wherein the drop link extends between the RSU and the drag link for increasing a travel distance of the RSU relative to a travel distance of the swing arm,
   wherein the RSU is mounted directly underneath the seat mechanism,
   wherein the seat mounting beam is cantilevered from a main frame of the motorcycle, and the seat is releasably secured to the mounting beam so as to be adjustable over a range of seat positions in a longitudinal direction of the mounting beam, and
   wherein the RSU is centrally mounted with respect to a transverse direction of the motorcycle.

16. The motorcycle of claim 15, wherein a swing arm tube of the swing arm and left and right frame sections of the main frame are longitudinally aligned for giving the appearance of a single frame line, and wherein the RSU is located between the left and right frame sections.

17. The motorcycle of claim 15, wherein the RSU is located beside at least one airbox with respect to a transverse direction of the motorcycle.

18. The motorcycle of claim 15, wherein the seat is adjustable in a vertical direction with respect to the motorcycle.

19. The motorcycle of claim 15, wherein the seat comprises a connecting means and the mounting beam comprises at least a slot for adjustably connecting the seat to the mounting beam.

* * * * *